United States Patent [19]

Schmersal

[11] 3,749,970

[45] July 31, 1973

[54] METHOD OF OPERATING GAS DISCHARGE PANEL

[75] Inventor: Larry J. Schmersal, Toledo, Ohio

[73] Assignee: Owens-Illinois Inc., Toledo, Ohio

[22] Filed: Oct. 8, 1971

[21] Appl. No.: 187,863

[52] U.S. Cl.................... 315/169, 315/153, 315/156
[51] Int. Cl. ............................................... H03f 3/68
[58] Field of Search..................... 315/169, 153, 156

[56] References Cited
UNITED STATES PATENTS
2,170,167   8/1970   Tarbox et al. .................. 315/153 X
3,524,986   8/1939   Harnden, Jr. ........................ 250/211

Primary Examiner—Nathan Kaufman
Attorney—Donald Keith Wedding et al.

[57] ABSTRACT

There is disclosed a method of supplying operating potentials to a gas discharge panel which comprises isolating the signal sources from any direct electrical connection with the gas discharge panel.

1 Claim, 1 Drawing Figure

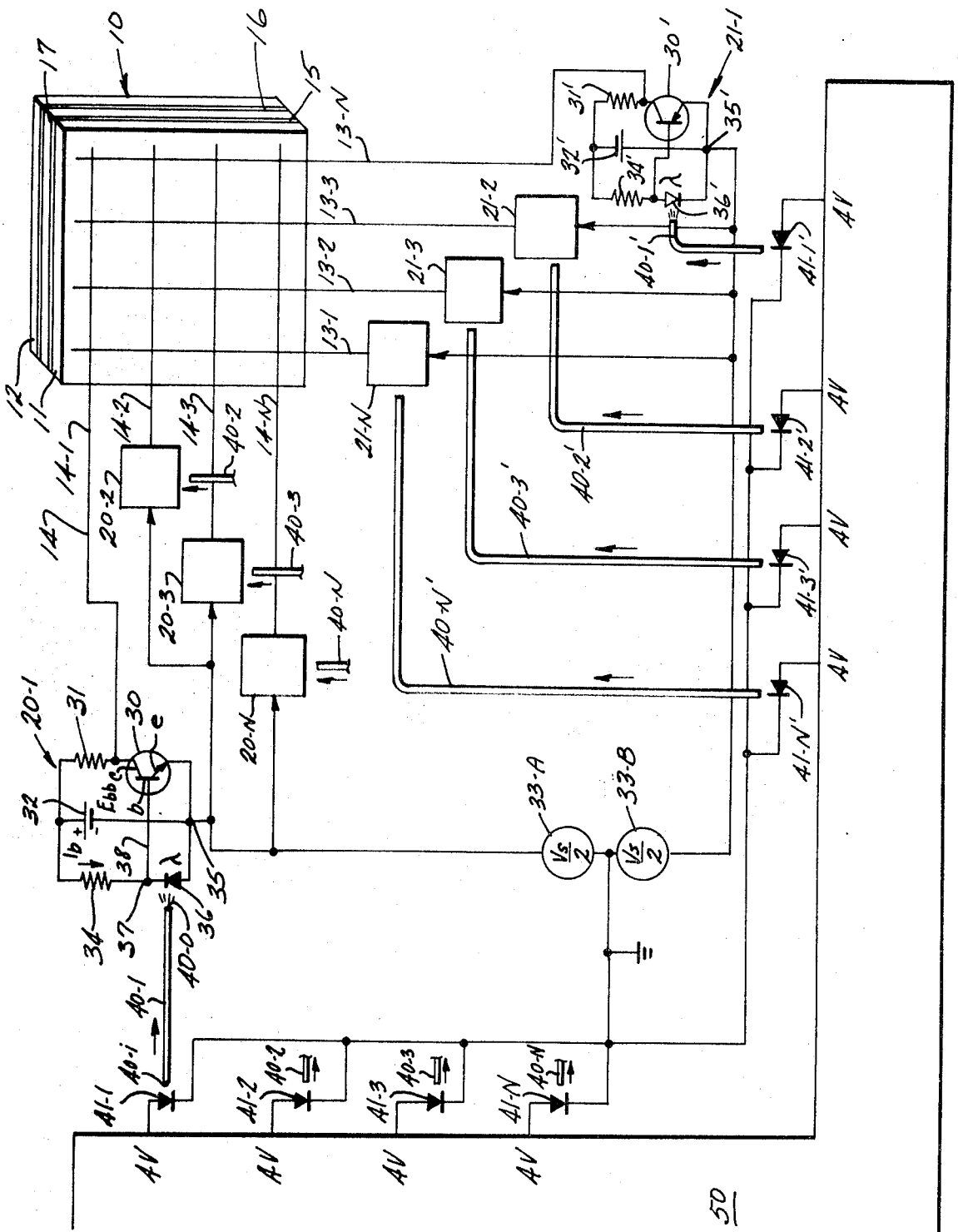

METHOD OF OPERATING GAS DISCHARGE PANEL

RELATED APPLICATION

This is an application filed under 35 U.S.C. 120 and relates to copending U.S. Pat. application Ser. No. 851,131, filed July 18, 1969 now U.S. Pat. No. 3,628,088.

BACKGROUND OF THE INVENTION

Gas discharge panels and devices of the pulsing discharge type (e.g., discharges terminated by stored charges) require relatively high operating voltages, the magnitude of which depends upon, among other things, the discharge gap, gas mixture and pressure, thickness of the dielectric. For example, the gas discharge panel disclosed in the above-referenced Nolan application requires sustaining voltages between about 300–400 volts supplied to conductor matrices defining discharge sites. High voltage pulses are added to such sustaining voltages at selected times to manipulate discharges at selected discharge sites. Command or information signals from a computer or other source of information to be displayed and/or stored are normally at a 4 volt level and such low voltages are of insufficient magnitude to manipulate the discharge condition of selected discharge sites. In the past, low voltage command or address voltages from addressing logic circuits have been translated to voltage level sufficient to manipulate discharges and selected discharge sites by transformers driven by two transistors. Also, high voltage transistor switches actuated by the low voltage command voltages are used to connect a high voltage direct current supply to conductors in the discharge site selection matrix. In such cases, the low voltage circuitry may require additional components to assure isolation of the high voltage supply from the low level logic circuits.

SUMMARY OF THE INVENTION

In accordance with the present invention, isolation of the low level command voltage source is achieved by a use of an optical couple. The low level command signal (4 volts) is converted to a pulse of radiant energy such as light, which may be directly coupled, or, preferably, transmitted by a fiber optic element, to a light sensitive transistor amplifier so that the low level command signal source is electrically isolated from the high level operating voltage, permitting different referenced grounds. Thus, the low voltage system can be earth ground referenced whereas the light sensitive transistor amplifier can be referenced to the high level periodic voltage necessary to sustain discharge within the discharge device at a selected site, once initiated.

BRIEF DESCRIPTION OF THE DRAWINGS

The above and other features, aspects and details of the invention will become more apparent from the following specification when considered with the accompanying drawing illustrating a preferred embodiment of the invention.

DESCRIPTION OF A PREFERRED EMBODIMENT

With reference to the drawing, a gas discharge panel 10 of the type disclosed in Nolan application Ser. No. 764,577 is constituted by a pair of relatively rigid support or plate members 11 and 12, respectively, each of which has on opposing surfaces thereof conductor arrays 13 and 14, respectively, cooperatively defining discharge site locations and a pair of thin dielectric members 15 and 16, respectively, plate member 11 and 12 being joined together and sealed by spacer sealant member 17. The opposing surfaces of thin dielectric members 15 and 16 constitute at least in part a portion of storage member forming walls of a thin gas chamber under about 10 mils thick, and preferably the gas chamber is about 4 to 6 mils thick. Transversely oriented conductor arrays 13 and 14 are supplied with operating potentials for selectively effecting discharges within the thin gas chamber between selected cross points or matrix points of a pair of the conductors of each array and sustaining and terminating discharges once initiated. The gas is one which is under a relatively high gas pressure so as to localize the discharges within the chamber and to confine charges produced on discharge to within the volume of gas in which they are created As set forth in the aforementioned Nolan application, the gas in the thin gas chamber has a breakdown voltage verses pressure-time-discharge gap distance which is relatively horizontal over a selected broad range of gas pressure and, preferably is a mixture of neon and argon gases wherein the neon constitutes about 99.9 percent atoms of the gas mixture and the argon constitutes about 0.1 percent atoms of the gas mixture. The gas is under pressure of about 0.2 atmosphere to about 5 atmosphere and preferably from about 0.2 atmosphere to about 1 atmosphere.

As further disclosed in the aforementioned Baker et al. and Nolan applications, charges produced on discharge of the gas are collected upon the discrete surface areas of dielectric members 15 and 16 and in effect constitute electric potentials opposing the potentials which created them and hence terminate the discharge. However, on a succeeding half cycle of applied potential, potential of the stored charges, being in the same direction, aid in initiating the next discharge and constitute an electrical memory. Because of the gas being at a relatively high pressure and separated from the operating conductors by dielectric material, relatively high periodic alternating potentials are required in order to sustain discharges once initiated. At the present time, typical sustaining voltage for a neon-argon panel lies within the range of 335 to 350 volts peak to peak at a frequency or rate of from about 30 to 50 kH$_z$ with 2 microsecond high voltage pulses superimposed or added to the sustaining voltage to manipulate the discharge condition of selected discharge sites. The normal magnitude of pulse potential required to initiate a discharge (assuming, of course, that the gas has been conditioned by ultra-violet or by other means as disclosed in the aforementioned patent application) is about the same as the sustaining potential.

Normally voltages from a computer or standard commercially available logic circuitry is in a neightborhood of 4 volts. In order to interface such low level signals with panels requiring voltages around 100 times larger is the problem with which the present invention deals.

As shown in the drawing, each conductor 14–1, 14–2, 14–3 . . . 14–n of conductor array 14 and each conductor 13–1, 13–2, 13–3, . . . and 13–n of conductor array 13 is provided with its own drive circuit.

Each row conductor in conductor array 14 and each column conductor in conductor array 13 is provided with its own driving or interface circuit, which in the drawing are designated as 20–1, 20–2, 20–3 and 20–n for row conductors 14-1, 14-2, 14-3, 14-n, respectively, and 21-1, 21-2, 21-3 and 21-n for column conductors 13. It will be appreciated that panel 10 will usually have many more conductors and conductor arrays 13 and 14, presently available panels having the conductors on 30 mil centers so that in a 4 inch display area in a panel there may be about 132 row conductors and 132 column conductors.

Interface circuits 20 include a switching transistor 30 of the NPN type having its collector C connected through resistor 31 to the positive terminal of a high voltage direct current source 32 ($E_{bb}$) and its emitter E connected to the negative terminal of high voltage direct current source 32. In addition, a periodic voltage, as for example, a sinusoidal voltage (Vs/2) from a sustaining voltage generator 33-A is applied to the common terminal 35 or connection between the negative terminal of battery 32 and the emitter electrode of transistor 30. As will be described later herein, the sustaining voltage from sustaining voltage generator 33-A constitutes ½ the sustaining potential necessary to be applied across the gas in the discharge gap in the panel to sustain discharges once initiated. Oppositely phased sustaining voltage (Vs/2) from sustaining generator 33-B is applied to column conductors 13 through addressing pulse circuits 21.

Connected in parallel with the high voltage direct current source 32 is a series circuit constituted by resistor 34 and photosensitive diode 36, the anode of diode 36 being connected to the common circuit point 35 for emitter electrode of transistor 30, the negative terminal of high direct current source 32 and the connection from sustaining generator 33-A. The common point 37 between resistor 34 and photosensitive diodes 36 is connected by a lead 38 to the base of transistor 30.

When photosensitive diode 36 is not illuminated, the resistance thereof is in the megaohm range and all of the current Ib enters the base b of transistor 30 turning this transistor on. Thus, the output voltage appearing at the collector of transistor 30 is essentially the sustaining voltage (Vs/2) from the sustaining generator 33a, passed by transistor 30.

Photosensitive diode 36 receives signal inputs in the form of burst of radiant energy, such as light, from a light bearing fiber optic element 40, photosensitive diode 36 being in close optically coupled relation to the output end 40-0 of fiber optic element 40. The input end 40-I of light bearing fiber element 40 is in close optically coupled relation with respect to light emitting diode 41, therebeing a light emitting diode 41 and fiber optic element 40 corresponding to each circuit 20 with the cathodes thereof commonly connected together and to the common system ground. Any 4 volt pulse as for example, a 4 volt logic pulse from logic-addressing circuit 50 causes the light emitting diode to which it is applied to emit light. Such light is coupled by a fiber optic element 40 to photosensitive diode 36 to cause the resistance thereof to drop from in the megaohm range to about 10,000 ohms which then causes the current Ib to flow to ground through photosensitive diode 36. As a result, transistor 30 is turned off and the output voltage rises to the potential of high voltage direct current source 32 added to the sinusoidal voltage from sustaining voltage generator 33-A. Thus, this output voltage now consists of a sine voltage plus an additive voltage (e.g., $Vs/2 + E_{bb}$). When the diode 41 is pulsed by 4 volt logic signals, then the output voltage Vs/2 will also have pulses added thereto of a magnitude essentially equal to source 32.

As noted earlier, the sustaining voltage sources 33-A and 33-B produce oppositely phase sustaining voltages so that ½ the required sustaining voltage is applied to column conductors 13 and ½ the required sustaining voltage is applied to row conductor 14. In order to accommodate this arrangement, pulsing circuit 21 utilizes PNP transistors 30', and opposite polarity high voltage direct current source 32' as well as an oppositely poled photosensitive diode 36', and except for this reversal of polarity, the operating principles are identical, it being understood that logic signal voltages applied to light sensitive diodes 41 are applied simultaneously to selected pairs of conductors, the crossing points of which defines a selected discharge site which it is desired to manipulate the discharge condition thereof.

It will be appreciated that other than sinusoidal voltages may be used to supply sustaining potentials. For example, alternating polarity square waves may be used in place of a sine wave. It will also be appreciated that signal produced at the base of transistor 30 may be used to switch a current pulse through a transformer primary to induce high voltages in the secondary thereof, the secondary being connected in series with a source of sustaining voltage as shown in application Ser. No. 699,170.

A feature of the circuit is that a 4 volt pulse, referenced to ground, may be used to control a very high voltage (300 volt) pulse that is referenced to or floats on a sine wave form or other periodic wave form. The fiber optic elements effectively isolates the two signals such that a 300 volt signal does not couple back into the 4 volt system. In addition, there are fewer components per interface circuit and, obviously, since transistor 30 is conducting when it is not pulsed, the line impedance is reduced thereby reducing cross-talk between matrix conductors. In the circuit disclosed, the high voltage pulsing circuit is isolated from the source of control signals via the optical coupling but other forms of isolation may be used so as to permit the pulse signals to be referenced to the sustaining voltage.

I claim:

1. In a method of supplying operating potentials to a gas discharge panel device of the type in which a thin gas discharge medium under pressure and bounded by dielectric charge storage members has the discharge condition of selected discharge sites therein manipulated by selectively applied high voltage pulses and pulse discharges maintained, once initiated, by a pair of relatively high, periodic sustaining voltages from a pair of sources by means of a pair of transverse row and column conductor arrays the cross points of which define the discharge sites and wherein voltages from a relatively low voltage electrical signal pulse source determine the occurrence of said high voltage pulse, each source of sustaining potential having a pair of output terminals from each source of sustaining potential to each other and a point of common potential so that said relatively high sustaining voltage sources being connected to conductors of said array respectively such that said panel floats with respect to a point of common potential, supply at least a pair of relatively opposite polarity high voltage pulses from a pair of generators to the row and column conductor arrays, and including causing the respective ones of said high voltage pulse geneator means to be responsive to control signal pulses and to generate high voltage pulses having as a reference point the instantaneous magnitude of said voltage periodic voltage from the one of said pair of sources it is connected with in series relation, the improvement comprising the step of converting each said low voltage electrical signal pulse, respectively, to a non-electric signal pulse, conveying said non-electric signal pulse along a fixed path and then converting said non-electric signal pulse to high voltage electric signal constituting said high voltage pulses having as a reference point the instantaneous magnitude of said periodic voltage from the one of said pair of sources, respectively, to thereby electrically isolate said low voltage signal sources from any direct electrical connection with said panel device.

* * * * *